3,343,499
CONVEYOR SYSTEMS
Arthur Thomas Charles Burrows, Stevenage, England, assignor to Geo. W. King Limited, Stevenage, England, a British company
Filed Oct. 13, 1965, Ser. No. 495,383
Claims priority, application Great Britain, Oct. 21, 1964, 43,022/64
7 Claims. (Cl. 104—172)

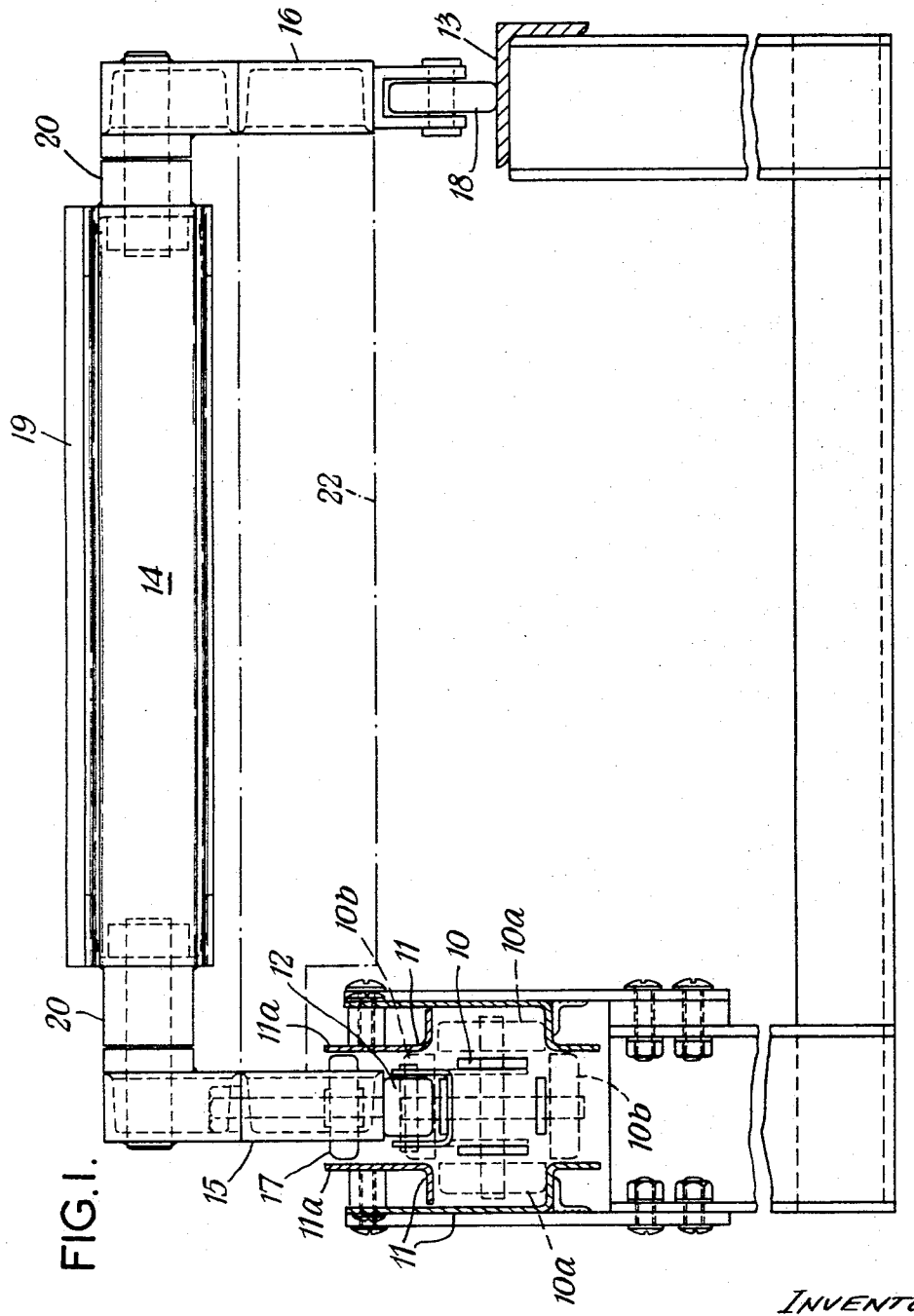

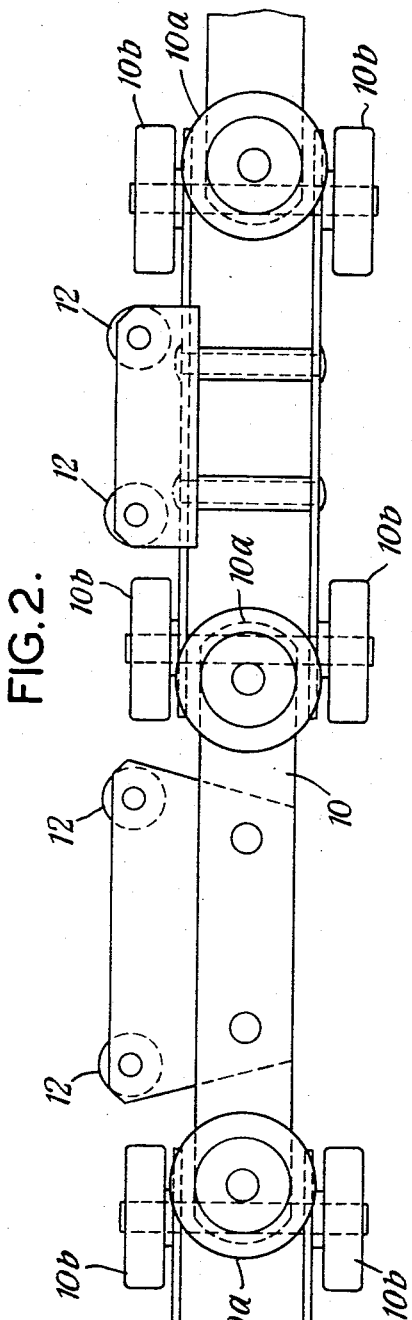

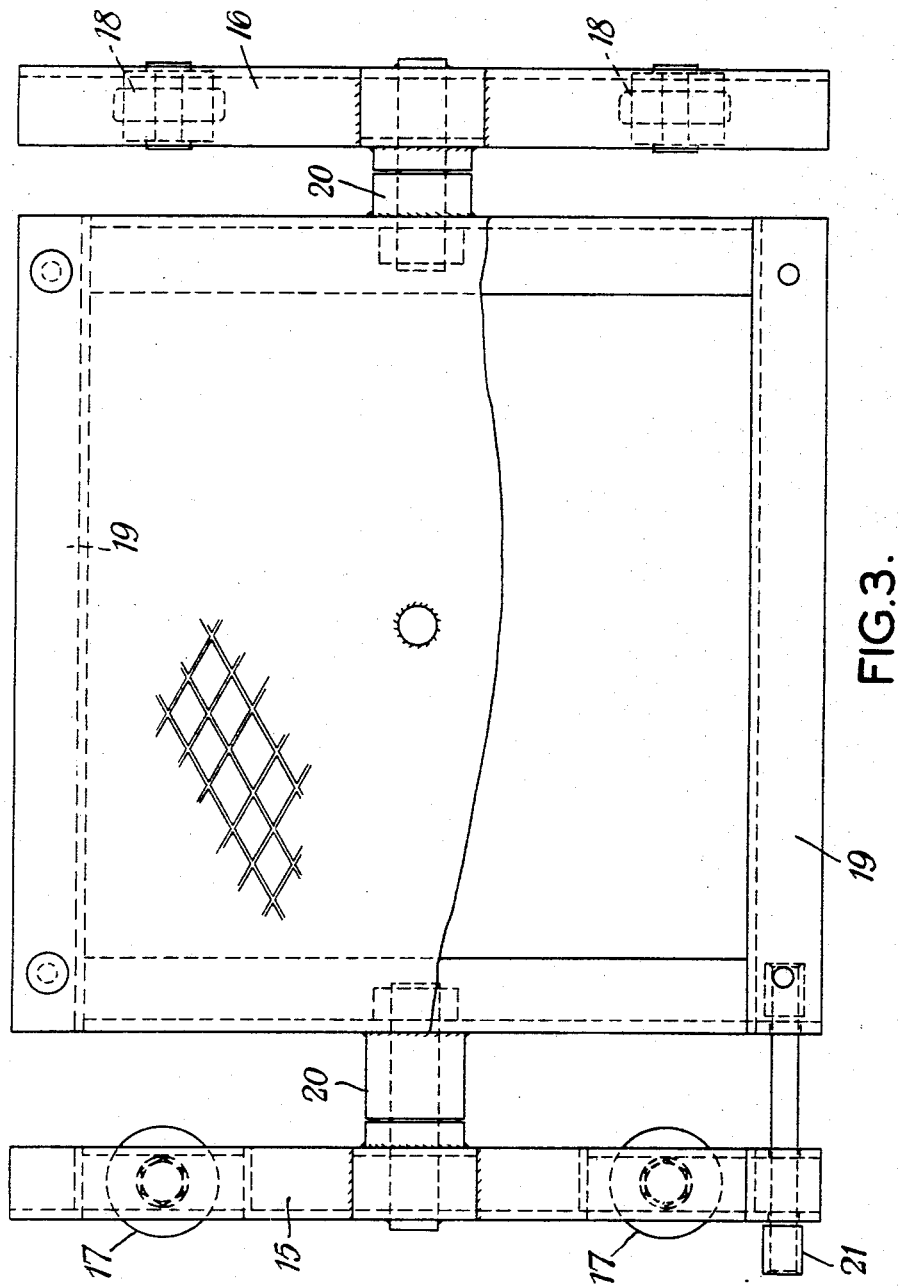

This invention relates to conveyor systems.

In factories or workshops it is common practice to locate a plurality of machines or work stations along a so-called production line so that workpieces or equipment may be passed successively from one machine or station to another to enable a series of successive operations to be carried out thereon. To facilitate movement of workpieces or equipment from one machine or station to another and thus to speed up production, conveyors of varying types have been used and it is the chief object of the invention to provide an improved conveyor system for that purpose which system is of simple construction and is relatively cheap to produce and easy to install. It is a further object of the invention to provide a conveyor system such that any workpiece or piece of equipment may be stopped at any machine or station without stoppage of or interference with the operation of the conveyor. It is yet a further object to provide a conveyor system such that the position of any workpiece or equipment being conveyed may be adjusted as and when required so that when located at any machine or work station it (the workpiece or equipment) will be appropriately positioned for the process which is to be carried out thereon.

Broadly in accordance with the invention it is proposed to provide a conveyor system wherein a plurality of pallets, trays or other load carriers are conveyed along a predetermined path by means of a single drive chain, the arrangement being such that the pallets, trays or the like will be supported at one side by said chain and at the other on a fixed track or runway which is appropriately spaced from and extends parallel to the chain. The chain will preferably be equipped with rollers which will serve as supporting means for one side of the pallets or the like while the latter will each be provided at the other side with rollers or the like adapted to engage or run on the fixed track or runway, the arrangement being such that while there will be sufficient tractive friction between the chain rollers and the pallets or the like to cause the latter to travel along with said chain, said pallets or the like may nevertheless be stopped at any time without interrupting the drive to the chain. Means will be provided to ensure effective lateral guidance of the pallets or the like which latter may also be so constructed that loads or equipment supported thereon may be capable of being turned angularly through 360° about a horizontal axis transverse to the direction of travel of the conveyor and/or about a vertical axis if so required.

In order that the said invention may be clearly understood and readily carried into effect reference will now be made to the accompanying drawings in which:

FIGURE 1 is a cross sectional view of a conveyor,

FIGURE 2 is a side elevational view of a portion of a drive chain employed in the embodiment shown in FIGURE 1, FIGURE 3 is a plan view of one form of pallet which may be employed.

Referring now to the drawings 10 denotes an endless driven chain which is generally of known type, such chain being provided at spaced points along its length with rollers 10a which are freely rotatable about normally horizontal axes and with rollers 10b freely rotatable about normally vertical axes, such rollers serving to support and guide the chain in its passage along a track 11 also of generally known form. As will be seen from FIGURES 1 and 2 the chain is provided with a series of freely rotatable rollers 12 which are so disposed that when the chain is travelling along a horizontal path, they (the rollers 12) will lie in a common horizontal plane above the general level of the chain. 13 denotes a second track which is appropriately spaced from and extends parallel to the track 11 which defines the path of travel of the chain 10. The chain 10 and the track 13 are adapted between them to support a plurality of pallets, trays or the like one of which is designated generally by 14 in FIGURE 1.

As will be seen from FIGURES 1 and 3 each pallet or the like comprises two side frames or beams 15, 16 which are disposed in spaced parallel relation, the spacing being related to that between the chain 10 and the track 13. The side frame or beam 15 is provided with two rollers 17 which are freely rotatable about normally vertical axes and are adapted to be located between extensions 11a of the chain track 11. The rollers 17 are adapted to provide lateral guide means for the pallet or the like such as will maintain it on the required path. The base or lower side of the frame or beam 15 is so formed that it will seat on and be supported by the rollers 12 carried by the chain 10.

The side frame or beam 16 is fitted with rollers 18 which are arranged freely to rotate about normally horizontal axes and are adapted to run on the track 13.

The arrangement as so far described is such that a pallet, tray or the like supported on the chain 10 and the track 13 will, when a drive is imparted to said chain, be caused to travel along the conveyor path, the arrangement being such that sufficient tractive friction is present between the rollers 12 and the side frame or beam 15 to ensure the pallet will move along the conveyor path when the chain is set in motion. The side frame or beam 16 will effectively be trailing, the rollers 18 merely running idly along the track 13. As indicated above the rollers 17 associated with the side frame or beam 15 will provide effective lateral guidance and will maintain the pallet correctly positioned in relation to the chain 10 and track 13.

In the embodiment illustrated in FIGURES 1 and 3 it will be seen that the pallet illustrated includes a main load supporting frame or platform 19 which is provided with trunnions 20 supported in the respective side frames or beams 15, 16. With such an arrangement the platform 19 will be capable of angular movement through 360° about the axis of the trunnions 20. Conveniently a locking bolt indicated at 21 will be provided to lock the platform 19 in its normal or horizontal position and means may be provided on the platform such that it will be possible with the aid of said bolt to lock said platform in any other position of angular adjustment if so required or alternatively appropriate additional devices may be provided for that purpose.

Instead of the construction above described and illustrated it may be desirable to interconnect the side frames or beams 15, 16 by one or more rigid transverse beams or frame members such as indicated in chain dotted lines at 22, FIGURE 1, and to mount the pallet, tray or the like on the frame or chassis thus produced. In such a case it would readily be possible to arrange for the pallet or the like to be rotatable about a vertical axis if so required and such movement could be additional to a capability of angular or pivoted movement about a transverse horizontal axis. The supporting frame or plateform 19 of the pallet or the like may take any form appropriate to the use to which the conveyor is to be put.

It may be mentioned here that the rollers 18 associated with the frame or side beam 16 may be of the castor type and also that in certain cases either or both of the sets of rollers 17, 18 might be replaced by freely rotatable balls or other appropriate devices which will perform the requisite functions.

A conveyor such as is indicated above may be utilised for progressing workpieces or equipment along a line of machines arranged to carry out a series of operations on such workpieces or equipment. The chain 10 and the track 13 may be so arranged as to form a long loop with two parallel sides joined by semi-circular ends or any other appropriate layout may be adopted. The separate workpieces or pieces of equipment to be machined will be positioned on separate pallets or the like which will be progressed successively in line one behind the other along the line of machines. Since the pallets or the like are not locked or physically coupled to the drive chain they may be held stationary at any time, e.g. when opposite a machine to permit of the required machining or other operation, without interrupting the drive to the chain and upon release they will again be caused to travel along with the chain. By virtue of the provision for angular or pivotal movement of the pallet or the like about one or more axes it will be possible appropriately to position any workpiece or equipment to allow of the requisite operation to be carried out thereon.

While the conveyor has been designed for employment such as is indicated above its use or application is not necessarily so limited and it may be employed in any appropriate case where it is required to progress pallets, trays or other load carriers along a predetermined path with the possibility of being able to stop any one or more at any point without interrupting the conveyor drive.

By employing a single drive chain the cost of such a conveyor is greatly reduced as compared with one employing two chains and moreover the tensioning of a single chain will be a simple matter. For example a tensioning unit may comprise an outer run of chain track and an inner run of fixed track, corresponding to the tracks 11 and 13 such outer or inner runs being securely mounted at a fixed distance apart and being so supported as to be capable of movement as a unit to adjust or vary the tension on the chain. Suitable bridging pieces will of course be provided to ensure smooth travel of the pallets or the like. Such a tensioning unit would of course normally be provided at one end of the conveyor arranged in the form of a long loop as referred to above but other locations may be adopted if desired.

What I claim is:
1. A conveyor system comprising:
a first track means;
endless chain means disposed in spaced parallel relation to the first track means;
at least one load carrier adapted to bridge the first track means and the endless chain means and having first means at one end movably associated with the first track means and second means at the other end frictionally engaging the chain means whereby the frictional engagement of the second means with the chain means causes the load carrier to travel in the direction of the engaged portion of the chain means and whereby the movement of the load carrier can be stopped at any time without interrupting the movement of the chain means;
said chain means including at least one roller freely rotatable about an horizontal axis and frictionally engaging and solely supporting the second means of the load carrier; and
guide means for retaining the second means in frictional engagement with the chain means, and for simultaneously retaining the first means in movable association with the first track means.

2. The conveyor defined in claim 1 wherein the first means movably associated with the first track means comprises at least one freely rotatable roller adapted to engage and run freely on the first track means.

3. The conveyor defined in claim 1 wherein the second means depends from the load carrier and includes a freely rotatable roller adapted to be guided by the guide means.

4. The conveyor defined in claim 1 wherein the chain means includes rollers freely rotatable about vertical and horizontal axes and adapted to be guided by the guide means.

5. The conveyer defined in claim 1 wherein the load carrier includes a platform rotatably supported for angular movement about a horizontal axis.

6. The conveyer defined in claim 1 wherein the load carrier includes a platform rotatably supported for angular movement about a vertical axis.

7. The conveyer defined in claim 1 wherein the load carrier includes a platform mounted for tiltable movement out of a horizontal plane and means for locking the platform in any required position.

No references cited.

ARTHUR L. LA POINT, *Primary Examiner.*

D. F. WORTH, *Assistant Examiner.*